(12) United States Patent
Baud-Grasset et al.

(10) Patent No.: US 6,734,326 B1
(45) Date of Patent: May 11, 2004

(54) METHOD OF TREATING AQUEOUS EFFLUENTS CONTAINING PEROXIDIZED COMPOUNDS

(75) Inventors: Frédéric Baud-Grasset, Lyons (FR); Aguès Pilas-Begue, Miribel (FR); Serge Veracini, Pfastatt (FR)

(73) Assignee: Rhodia Polyamide Intermediates, Courbevoie Cedex (FR)

( * ) Notice: Subject to any disclaimer, the term of this patent is extended or adjusted under 35 U.S.C. 154(b) by 0 days.

(21) Appl. No.: 10/129,078

(22) PCT Filed: Oct. 31, 2000

(86) PCT No.: PCT/FR00/03040

§ 371 (c)(1),
(2), (4) Date: Feb. 27, 2003

(87) PCT Pub. No.: WO01/32567

PCT Pub. Date: May 10, 2001

(30) Foreign Application Priority Data

Nov. 3, 1999 (FR) .............................. 99 14015

(51) Int. Cl.$^7$ ................................ C07C 49/105
(52) U.S. Cl. ...................................... 568/376
(58) Field of Search .......................... 568/376

(56) References Cited

U.S. PATENT DOCUMENTS 5,370,801 A * 12/1994 Sorensen

FOREIGN PATENT DOCUMENTS

| EP | 0 134 766 | 3/1985 |
| GB | 1 438 697 | 6/1976 |

* cited by examiner

Primary Examiner—Paul J. Killos
(74) Attorney, Agent, or Firm—Burns, Doane, Swecker & Mathis, L.L.P.

(57) ABSTRACT

The present invention relates to a method of purifying aqueous effluents containing in particular peroxidized compounds.

It relates more particularly to a method of purifying aqueous effluents comprising a method of anaerobic biological decomposition of the compounds contained in the effluent. The effluents are treated prior to their anaerobic biological decomposition, in a deperoxidation step in order to reduce the concentration of peroxide and to avoid the harmful effect of these compounds on the enzymes or bacteria.

8 Claims, No Drawings

METHOD OF TREATING AQUEOUS EFFLUENTS CONTAINING PEROXIDIZED COMPOUNDS

The present invention relates to a method of purifying aqueous effluents containing in particular peroxidized compounds.

It relates more particularly to a method of purifying aqueous effluents comprising a method for the anaerobic biological decomposition of the compounds contained in the effluent.

The effluents which can be treated by the method of the invention in particular those produced by methods of oxidizing organic compounds.

Among these methods, the method of oxidizing hydrocarbons such as cyclohexane is exploited on a large scale. Thus, the conversion of cyclohexane to cyclohexanol/cyclohexanone is used for the manufacture of adipic acid, a major chemical intermediate for the manufacture of many products such as in particular polyamides, polyesters, polyurethanes. This manufacture of cyclohexanol/cyclohexanone is carried out in large industrial units which produce annually up to a few hundreds of thousands of tones which generate large volumes of effluents. The constraints imposed for the protection of the environment require these effluents to be treated, in particular in order to reduce the chemical oxygen demand (COD).

The reduction of the COD of aqueous effluents has been performed for a very long time, by many methods including biological methods of treatment using enzymes.

These biological treatments can be classified mainly into three categories, namely the methods of aerobic and anoxic purification and the methods of anaerobic purification.

However, it is known that the methods of anaerobic purification of waste water, in particular that containing more than 1 g/l of degradable COD, are preferred to the methods of aerobic purification. Indeed, the anaerobic methods produce products which are useful and whose value can be enhanced, such as methane. Furthermore, the energy required for carrying out an anaerobic method is less than that used in an aerobic method. In addition, the methods of anaerobic purification produce a quantity of sludge which is substantially less than the aerobic methods.

However, methods of anaerobic purification cannot be used to treat aqueous effluents because the enzymes used are sensitive and can be destroyed by numerous compounds.

The Applicant has thus observed that the treatment of aqueous effluents produced by the method of converting cyclohexane in the synthesis of the cyclohexanol/cyclohexanone mixture by an anaerobic method can lead to a destruction of the enzymes. The use of such a method therefore appeared to be impossible.

One of the aims of the present invention is to provide a method of treating the effluents resulting from the manufacture of a cyclohexanol/cyclohexanone mixture and more particularly methods of oxidizing olefins to alcohols and/or acetones by an anaerobic biological purification method.

Indeed, the Applicant has observed that these effluents contain various organic compounds and peroxidized compounds. It has also observed that these peroxidized compounds have a toxic effect on the enzymes or bacteria used in the methods of biological purification.

To this effect, the invention provides a method of anaerobic biological purification of aqueous effluent containing peroxidized compounds and organic compounds which are biodegradable. This method is characteriz d in that it consists in.

treating the effluents in order to convert the peroxidized compounds to oxidized compounds, purifying the deperoxidized aqueous effluents in a method of anaerobic biological treatment by decomposition to methane and carbon dioxide.

The Applicant has found that the aqueous effluents, after elimination by conversion of the peroxidized compounds, can be effectively purified and without damaging the enzymes and the bacteria in a conventional method of anaerobic biological treatment, with production of methane and carbon dioxide.

A general description of these anaerobic biological treatments is, for example, given in a communication presented by P.L. McCarty at the Second International Conference on Anaerobic Digestion on Jul. 9, 1981 in Travemunde—Germany under the title "100 years of anaerobic treatment".

For the treatment of effluents containing mainly soluble organic compounds, a method of bioconversion has been developed under the name "Upflow Anaerobic Sludge Blanket" (UASB).

Such a method is described in many publications. There may be mentioned for example, "Upflow Sludge Blanket Processes", 3rd International Symposium on Anaerobic Digestion, 1983, Cambridge, by G. Lettinga et al.

"Anaerobic of Raw Domestic Sewage" by G. Lettinga et al. in Biotechnology and Bioengineering Vol. XXV, pp. 1701–1723,1983.

According to the invention, the aqueous effluents containing organic compounds and peroxidized compounds should be treated in a step called "deperoxidation" which consists in heating them to a temperature greater than 20° C., preferably of between 50° C. and 90° C., in the presence of a deperoxidation catalyst. This catalyst is advantageously a metal compound.

As suitable metal compounds, the compounds of transition metals may be used, such as the ferric compounds, for example.

Advantageously, the concentration of catalyst is between 0.5 and 100 ppm, expressed as weight of metal.

The deperoxidation reaction is controlled by chemical assay of the peroxides. This reaction is continued in order to obtain a concentration in mMol/l of peroxide of less than 5 mMol/l, advantageously less than 2 mMol/l.

According to another advantageous characteristic of the invention, it may be favorable to treat, by the biological purification method, effluents whose COD is less than 30 g/l. This concentration may also be obtained by diluting with water the effluents derived from the methods of synthesis of chemical compounds, before or after the deperoxidation step.

Moreover, after deperoxidation, the pH of the effluents is adjusted to a value of between 5.5 and 6.5. This adjustment is performed by addition of a basic soluble compound such as sodium hydroxide, the basic salts of sodium and the like.

However, this adjustment of the pH may be performed by addition of acidic compounds, if the pH of the effluents after deperoxidation is basic.

The effluent thus treated is fed in the anaerobic bioconversion method which generally comprises a first step of converting the organic compounds to light carboxylic acids such as acetic and propionic acid and then a second step of digestion during which the organic compounds are decomposed to methane and carbon dioxide.

The method of the invention applies in particular to the treatments of effluents resulting from the methods of oxidizing olefins to alcohols and ketones and more particularly the methods of oxidizing cyclohexane in order to obtain a mixture of cyclohexanol/cyclohexanone which, through another oxidation, leads for example to the synthesis of adipic acid.

The aqueous effluent to be treated, derived from this method of manufacturing an alcohol/ketone mixture has a concentration of the order of 100 to 1000 mg/l of peroxidized compounds expressed as cyclohexyl hydroperoxide, and also carboxylic acids, alcohols and the like, and a COD of the order of 5 to 50 g/l.

This effluent is treated in a first deperoxidation step, after possible dilution with water. The rate of conversion of the peroxides is adjusted in order to obtain a final peroxide concentration compatible with the anaerobic bioconversion treatment, indicated above.

In one embodiment of the invention, this deperoxidation step is advantageously performed in a reactor.

The effluent thus deperoxidized and which has a pH compatible with the bioconversion treatment is fed to a first digester. In this first digester, the organic compounds are converted to monocarboxylic acid compounds such as acetic and propionic acid. This step is also called the "acetogenesis" step.

The medium thus treated is fed to a second digester in order to convert the organic compounds mainly to methane. This step is called methanogenesis. The gas collected in this step consists of at least 80% by volume of $CH_4$ and can therefore be upgraded as fuel.

The method of the invention made it possible to reduce the COD of the initial effluent by more than 70%, or even more than 80%.

Likewise, the BOD (Biological Oxygen Demand) was reduced by at least 90%.

Consequently, the effluents treated according to the method of the invention can be fed to waste water treatment plants, or discharged directly.

Other advantages, details of the invention will appear more clearly in the light of the examples given below solely as a guide.

Among the major industrial methods, the oxidation of cyclohexane to a cyclohexanol/cyclohexanone mixture is used on a large scale.

This method generates aqueous effluents containing many organic compounds such as adipic acid, glutaric acid, succinic acid, acetic acid, formic acid, cyclohexanol and cyclohexanone for example.

The effluents also comprise peroxides expressed as cyclohexyl hydroperoxide (HPOCH) in relatively large quantities, in the order of a few mMol/l. These effluents have a COD of between about 5 and 20 g/l.

A treatment of these effluents in an anaerobic bioconversion method, according to a UASB method, cannot be performed because the biomass may become inactive very rapidly.

To allow such a treatment, the invention proposes treating these effluents before supplying them to the biological method.

In the example illustrated, the aqueous effluent resulting from the method of manufacturing a cyclohexanol/cyclohexanone mixture, consisting of the combination of various effluents of the method, is heated in a first reactor at a temperature of 60° C. for 24 hours.

To promote the conversion of the peroxides, a solution of ferric chloride is added in order to obtain a concentration of 2 mg/l, expressed by weight of iron.

After the peroxide concentration has reached a level of less than 1 mMol/l, the effluent is cooled to a temperature of 37° C. and is then neutralized by addition of a sodium hydroxide solution in order to obtain a pH of between 5.5 and 6.5.

To allow a better bioconversion, it is advantageous to add calcium, nutrients and trace elements to the medium. This addition may be made before the deperoxidation step.

The calcium is added in the oxide form at a concentration of between 20 and 200 mg of calcium per litre of effluent.

The nutrients are mainly phosphorus, nitrogen, which are added in the form of aqueous ammonia and phosphoric acid, respectively.

The trace elements are for example cobalt, nickel and manganese salts.

The effluent is fed to the digesters of a UASB process with a closed loop circulation of the effluent, the effluent leaving the digesters is advantageously recycled to the deperoxidation reactor.

A portion of the effluents leaving the digesters is drawn off. The yield of conversion of COD is about 83%. The gas recovered at the outlet of the digesters is a mixture of methane and $CO_2$ at 77% by volume as methane.

The concentrations of carboxylic acids and peroxides in the effluent drawn off are less than the detection limits.

These results were obtained with an incoming effluent stream of 8 l/h and an outgoing effluent stream of 8 l/h for a biomass gas flow rate of 6.72 l/h. The plant operated correctly for the duration of the trial which lasted for several weeks.

What is claimed is:

1. Method of treating aqueous effluents containing peroxidized compounds and organic compounds which are biodegradable, comprising:

treating the effluents in order to convert the peroxidized compounds to oxidized compounds by heating the effluent to a temperature greater than 20° C., in the presence of a catalyst; and treating the deperoxidized effluents in a method of anaerobic biological purification by conversion to methane and carbon dioxide.

2. Method according to claim 1, wherein the catalyst comprises at least one compound of a metal element selected from the group consisting of compounds of transition metals.

3. Method according to claim 1, wherein the pH of the deperoxidized effluents is adjusted to a value of between 5.5 and 6.5 before supplying in the method of anaerobic biological treatment.

4. Method according to claim 1, wherein the aqueous effluent is obtained from a method of oxidizing olefins to alcohols and/or ketones.

5. Method according to claim 4, wherein the oxidation method is the method of oxidizing cyclohexane to cyclohexanol/cyclohexanone.

6. Method according to claim 4, wherein the effluents resulting from the deperoxidation method are diluted with water in order to obtain a peroxide content of less than 1 mMol/l expressed as cyclohexyl hydroperoxide.

7. Method of treating aqueous effluents containing peroxidized compounds and organic compounds which are biodegradable, comprising:

treating the effluents in order to convert the peroxidized compounds to oxidized compounds by heating the effluent to a temperature greater than 20° C., in the presence of a catalyst; and treating the deperoxidized effluents in a method of anaerobic biological purification by conversion to methane and carbon dioxide, wherein the catalyst comprises at least one compound of a metal element selected from the group consisting of compounds of transition metals.

8. Method of treating aqueous effluents containing peroxidized compounds and organic compounds which are biodegradable, comprising:

treating the effluents in order to convert the peroxidized compounds to oxidized compounds by heating the effluent to a temperature greater than 20° C., in the presence of a catalyst; and treating the deperoxidized effluents in a method of anaerobic biological purification by conversion to methane and carbon dioxide, wherein the pH of the deperoxidized effluents is adjusted to a value of between 5.5 and 6.5 before the anaerobical treatment.

* * * * *